(12) United States Patent
Olver

(10) Patent No.: US 7,861,981 B2
(45) Date of Patent: Jan. 4, 2011

(54) PROTECTIVE SADDLE MOUNT FOR CABLE TIE

(75) Inventor: Bryan William Olver, Nobleton (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 0 days.

(21) Appl. No.: 12/255,939

(22) Filed: Oct. 22, 2008

(65) Prior Publication Data

US 2010/0096511 A1 Apr. 22, 2010

(51) Int. Cl.
| | |
|---|---|
| F16L 3/22 | (2006.01) |
| F16L 3/08 | (2006.01) |
| F16L 3/12 | (2006.01) |
| F16L 33/00 | (2006.01) |
| F16B 15/00 | (2006.01) |
| F16B 45/00 | (2006.01) |
| A41F 1/00 | (2006.01) |
| A41F 1/08 | (2006.01) |
| A44B 1/04 | (2006.01) |
| A44B 1/18 | (2006.01) |
| A44B 11/25 | (2006.01) |
| A44B 17/00 | (2006.01) |
| B42F 1/00 | (2006.01) |
| B65D 63/00 | (2006.01) |
| B65D 67/02 | (2006.01) |

(52) U.S. Cl. .............. 248/68.1; 248/65; 248/74.1; 248/74.2; 248/74.3; 248/74.4; 248/71; 248/73; 248/230.8; 248/228.8; 24/455; 24/458; 24/16 PB

(58) Field of Classification Search .......... 248/65, 248/74, 74.1, 74.2, 74.3, 74.4, 74.5, 71, 73, 248/68.1, 230.8, 228.8; 24/455, 458, 16 PB
See application file for complete search history.

(56) References Cited

U.S. PATENT DOCUMENTS

| | | | | |
|---|---|---|---|---|
| 2,679,993 | A | * | 6/1954 | Christophersen ........... 248/27.1 |
| 2,915,268 | A | * | 12/1959 | Wrobel ..................... 248/74.3 |
| 3,362,069 | A | | 1/1968 | Blackwell |
| 3,632,070 | A | * | 1/1972 | Thayer ...................... 248/68.1 |
| 3,632,071 | A | | 1/1972 | Cameron et al. |
| 3,913,876 | A | | 10/1975 | McSherry |
| D280,597 | S | | 9/1985 | Fortsch |
| 4,728,064 | A | * | 3/1988 | Caveney .................... 248/74.3 |
| 4,766,651 | A | * | 8/1988 | Kobayashi et al. ........ 24/16 PB |
| 4,768,741 | A | * | 9/1988 | Logsdon ..................... 248/62 |

(Continued)

OTHER PUBLICATIONS

<< A Cable Management Done Right >> Author : A'nD Cable Products.

(Continued)

*Primary Examiner*—Terrell Mckinnon
*Assistant Examiner*—Christopher Garft
(74) *Attorney, Agent, or Firm*—Ogilvy Renault LLP

(57) ABSTRACT

A method and apparatus for providing a mounting system for an elongated item such as a cable, tube or wire, or an assembly of multiple cables, tube and/or wires. The mounting system includes an apparatus for mounting to a supporting structure, and an apparatus for receiving the elongated item. Also included is an apparatus for receiving a tying member such as a cable tie. Also included is an apparatus for permitting the tying member to be cut to release the elongate item from the mount without damage to the elongate item.

13 Claims, 5 Drawing Sheets

U.S. PATENT DOCUMENTS

| | | |
|---|---|---|
| 4,805,856 A | 2/1989 | Nicoli et al. |
| D331,186 S | 11/1992 | Sachs |
| D347,782 S | 6/1994 | Wentzel |
| 5,332,179 A | 7/1994 | Kuffel et al. |
| 5,673,889 A * | 10/1997 | DeValcourt ............ 248/229.17 |
| D399,414 S | 10/1998 | Viklund |
| 5,839,169 A * | 11/1998 | Edwards et al. ........... 24/16 PB |
| 6,367,745 B1 | 4/2002 | Winton, III |
| 6,533,226 B2 | 3/2003 | Geiger |
| 6,669,151 B2 | 12/2003 | Mascadri |
| 6,981,683 B2 | 1/2006 | Winton, III |
| D543,835 S | 6/2007 | Geiger |
| 7,316,375 B2 * | 1/2008 | Wakabayashi et al. ........ 248/71 |

OTHER PUBLICATIONS

"Saddle Type Tie Mounts" Author: Hyperline Systems Canada Ltd.
"Cable Saddle" Author. Black Box Network Services.

* cited by examiner

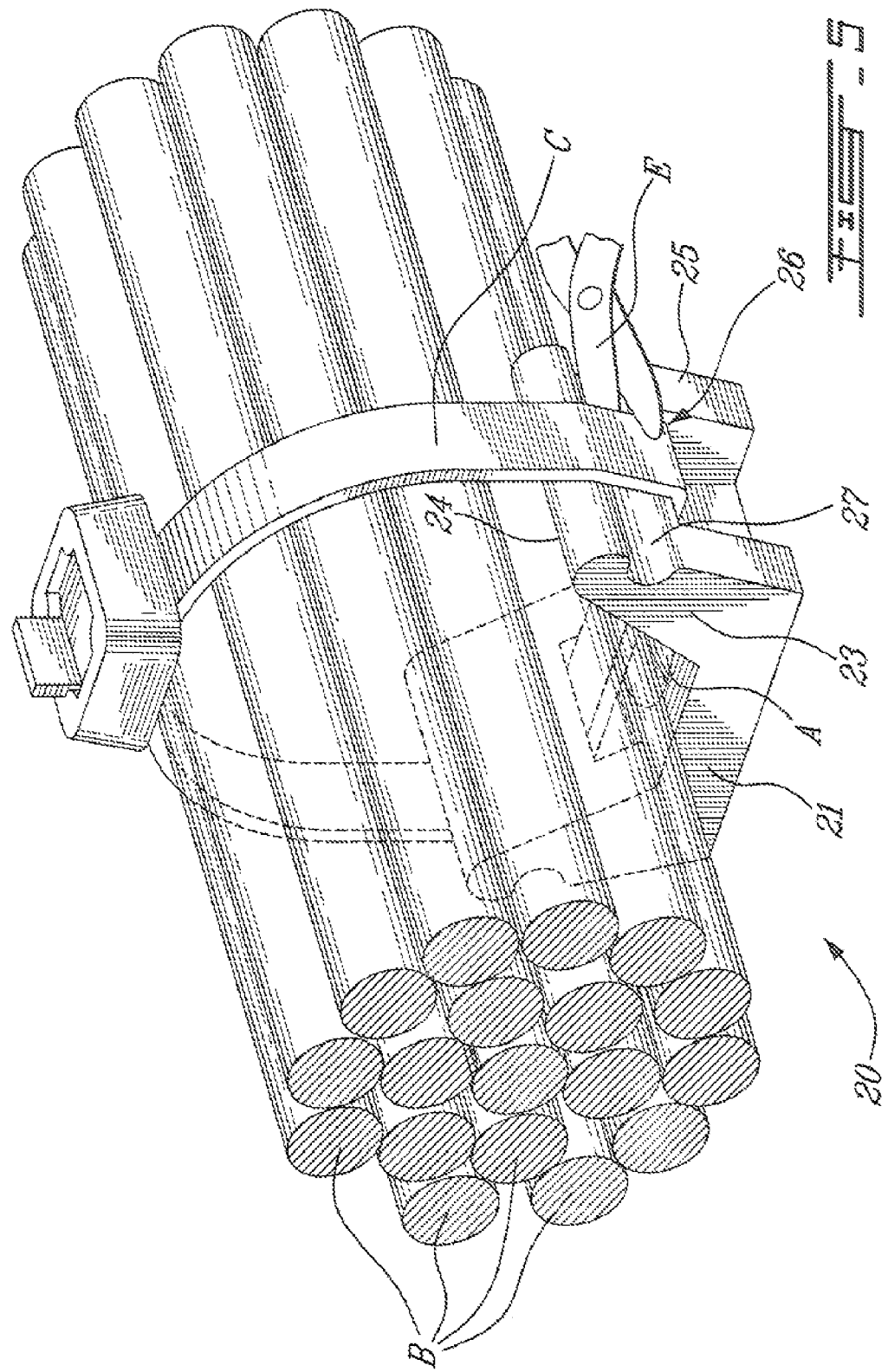

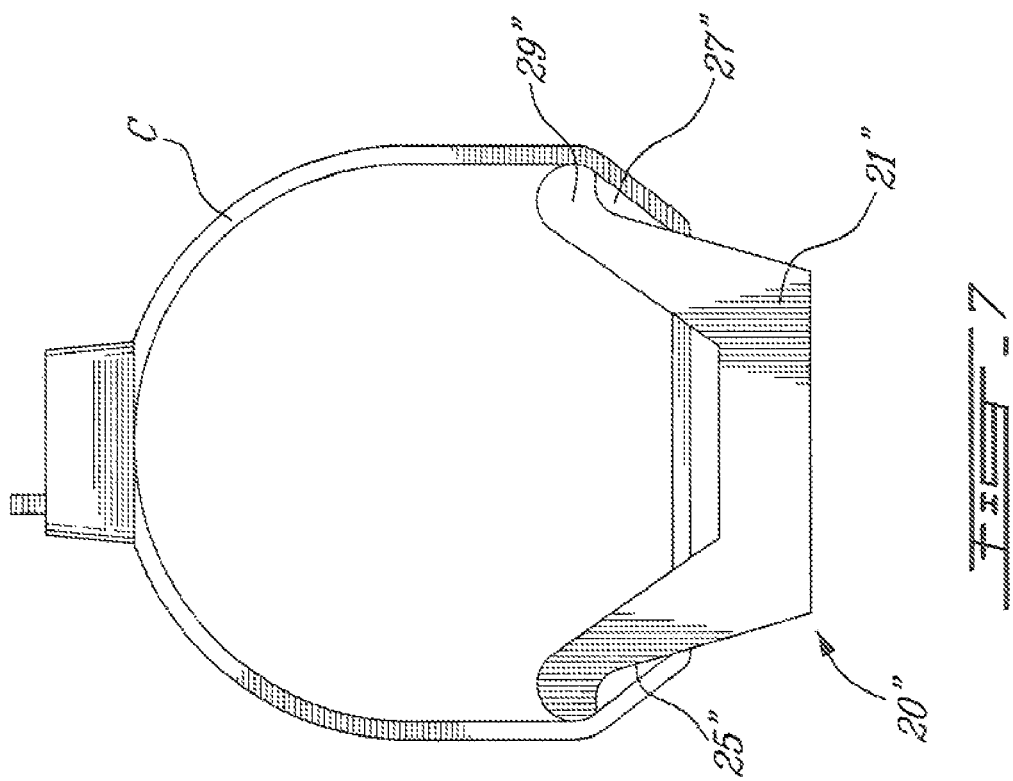
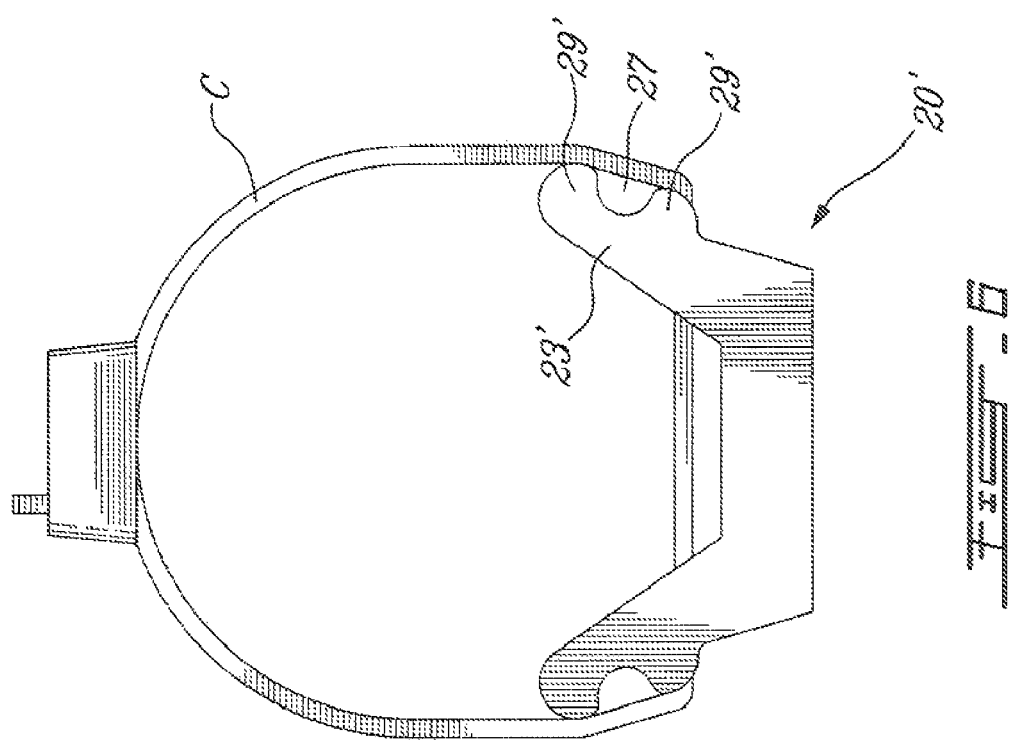

PROTECTIVE SADDLE MOUNT FOR CABLE TIE

TECHNICAL FIELD

The present application relates to the field of mounts for use with a cable tie, and more particularly to saddle mounts therefor.

BACKGROUND OF THE ART

Cable ties are well known for holding cables to a fixed structure. Such cable ties are used, for example, to mount electrical wiring and similar items to the exterior of a gas turbine engine. However, in order to access the underlying structure, such as to open or service the gas turbine engine, it is often required to remove the cables, etc., to allow access. Typically, this is done by simply cutting the cable ties and then removing the cable, however, the cables may be nicked or damaged by the manipulation of the cutting tool used to cut the ties. Thus, either additional time or care must be used in cutting, and/or occasional repair or replacement of nicked cables is required. Neither of these situations is desirable, and therefore improvement is desired.

SUMMARY

It is an object of the present disclosure to provide a novel method for releasing elongated flexible items from a saddle mount.

According to one aspect, there is provided a saddle mount for connecting elongated flexible items to a structure comprising: a base adapted to be secured to the structure; a pair of spaced-apart walls each projecting from the base to a wall free end, the walls thereby forming a saddle with the base, the walls each having an aperture between the base and the free end for receiving a tying member, the walls each having inner surface facing the other wall and an outer surface on an opposite side of the wall, at least one of the spaced-apart walls having in its outer surface at least one recess, the recess disposed between the aperture and the free end, the recess extending laterally across the outer surface a distance greater than a lateral width of the aperture, the recess thereby configured to permit a cutting surface to access an underside of the tying member extending through the apertures.

In accordance with another aspect, there is provided a cable mounting assembly comprising: a mount configured to be secured to a supporting structure, the mount having an interior area and at least one outer surface, the interior area configured to receive a cable-like item, the outer surface having an aperture for permitting insertion of an elongate cable tying member through the aperture for securing said item to the mount, the outer surface extending to a free end, the outer surface having means for providing access to an underside of the tying member to facilitate cutting the tying member, said means disposed between the aperture and the free end.

In accordance with a still further aspect, there is provided a method of providing a cable mounting apparatus, comprising: providing a mount having an open ended body having an interior area for receiving cables along a main axis, the body having an outer surface opposite to said interior area; defining a passage in said open ended body transversally to said main axis for receiving a cable tie; providing a groove on the outer surface of the body, and sizing the groove to permit a cutting tool to access an underside of the cable tie.

BRIEF DESCRIPTION OF THE DRAWINGS

FIG. 5 is a perspective view of the saddle mount and cables of FIG. 3, with a cutting tool sectioning the tying member;

FIG. 6 is an elevation view of another embodiment of a saddle mount; and

FIG. 7 is an elevation of a further possible variant of the saddle mount.

It will be noted that throughout the appended drawings, like features are identified by like reference numerals.

DETAILED DESCRIPTION

Figure 1:
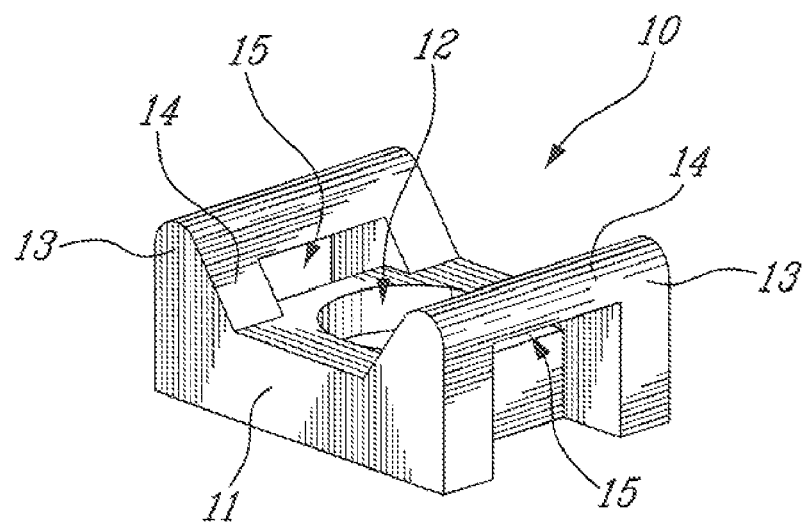
FIG. 1 is a perspective view of saddle mount constructed in accordance with the prior art.

In order to better understand the present disclosure, it is first helpful to consider the context of the prior art. In FIG. 1, there is illustrated a saddle mount in accordance with the prior art. The saddle mount is used to connect elongated flexible items such as cables, wires, hoses or pipes to a structure, using a cable tie or other tying member. The prior-art saddle mount 10 has a base 11 with a centrally-opened counterbore 12 to secure the saddle mount 10 to a structure using a fastener. Walls 13 are provided on opposed sides of the base 11, and feature inclined surfaces 14 to form a saddle with the base 11, and passages 15. A cable tie (not shown) is passed through the passages 15 and straps the cables (not shown), thereby securing the cables to the saddle mount 10. To release the cables from the saddle mount 10, a cutting tool must be used to cut the tie.

Figure 2:
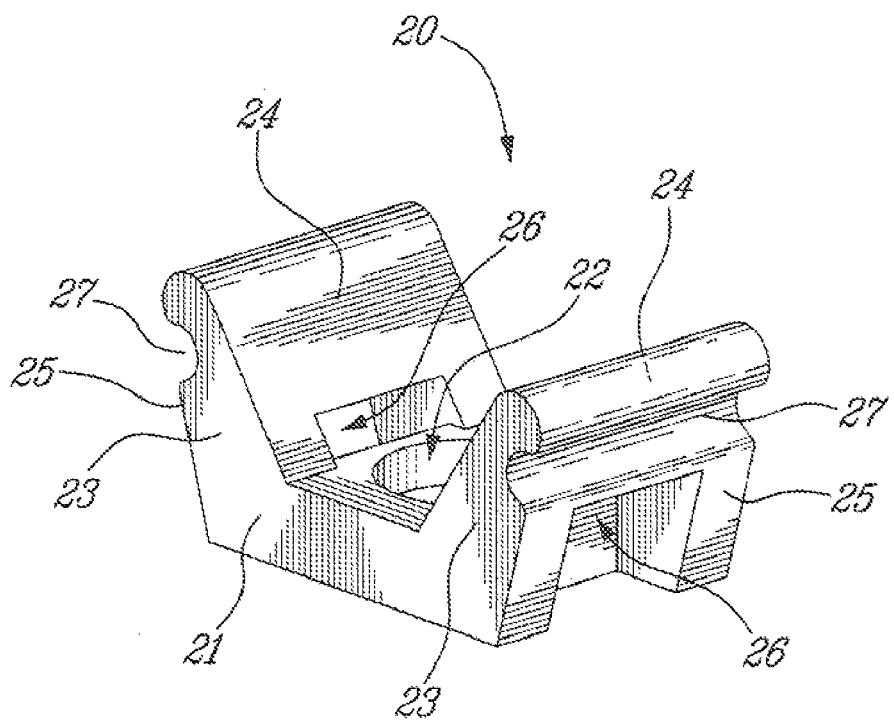
FIG. 2 is a perspective view of a saddle mount constructed in accordance with an embodiment of the present disclosure.

Now referring to FIG. 2, there is shown an embodiment of a protective saddle mount 20 in accordance with the present disclosure. The saddle mount 20 is used to connect elongated flexible items to a structure. The elongated flexible items may be, amongst numerous possibilities, cables, wires, tubing, and pipes. For simplicity purposes, the saddle mount 20 is hereinafter described and illustrated as being used with cables.

The saddle mount 20 has a base 21 by which it is secured to a structure. The base 21 may have a generally planar undersurface so as to be used against a flat surface of a structure. The base 21 may have different shapes or configurations as a function of the structures to which it will be connected. For instance, the undersurface may be semi-circular or arcuate to be connected to pipes or like rounded surfaces.

Figure 4:
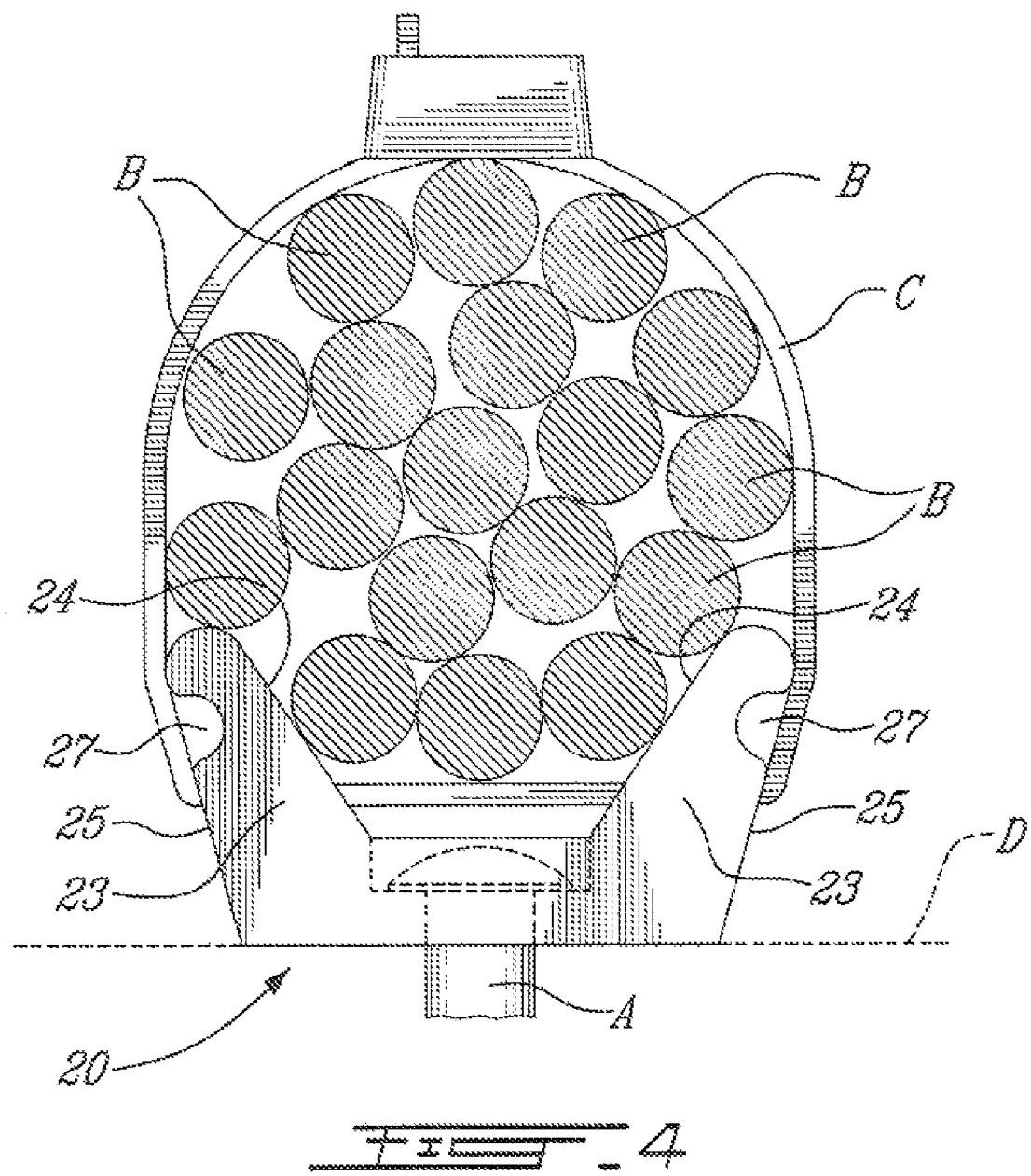
FIG. 4 is an elevation view of the saddle mount and cables of FIG. 3.

As shown concurrently in FIGS. 2 and 4, the base 21 has a counterbore 22 with a central throughbore. The counterbore 22 accommodates the head of a fastener A such as a bolt, a screw, a nail or the like, while the connector portion of the fastener (e.g., threaded rod) passes through the central throughbore to secure the base 21 to a structure. The base 21 may have more that one counterbore 22, or may be provided with alternative connection means to be secured to a structure. As illustrated in FIG. 4, the counterbore 22 is sized such that the head of the fastener A is fully received therein.

Figure 3:
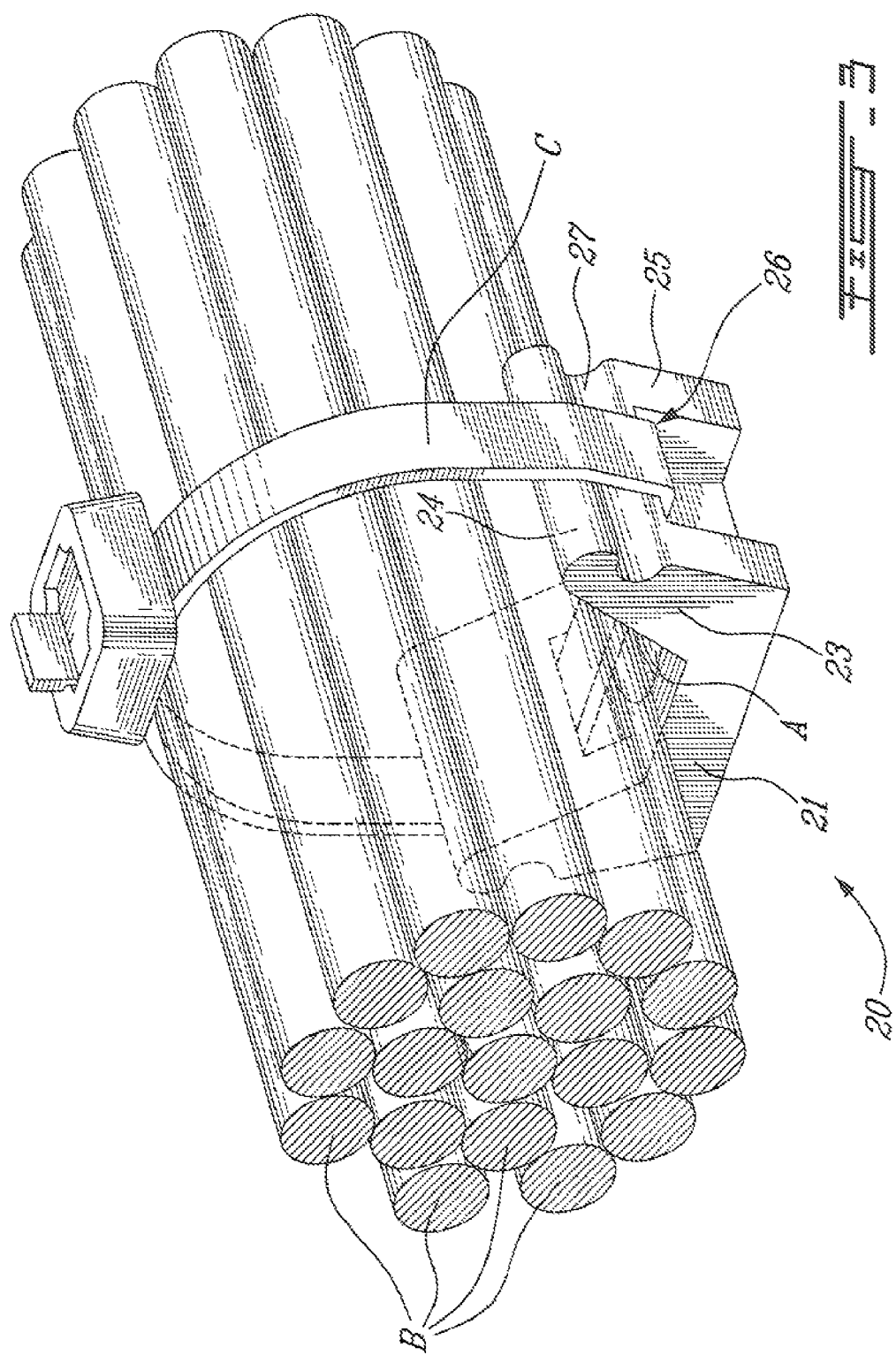
FIG. 3 is a perspective view of the saddle mount of FIG. 2, strapping cables with a tying member.

Walls 23 project from opposite sides of the base 21, thereby giving the saddle mount 20 a V-shape, i.e., saddle shape. The walls 23 each have an inclined inner surface 24. The inclined inner surfaces 24 define an interior area of the saddle, against which cables B (FIG. 4) abut when axially positioned to the saddle mount 20 and strapped thereto. The walls 23 each have an outer lateral surface 25, against which a tying member C lies when connecting the cables B to the saddle mount 20. In FIGS. 3-4, the tying member C is illustrated as being a cable tie (i.e., a tie wrap), but may be any other suitable tying member, such as a rope, hose connector, wire or the like. A junction between the inclined inner surface 24 and the outer lateral surface 25 may be rounded, whereby the free ends of the walls 23 do not expose straight edges.

Passages 26 are defined in each of the walls 23. The passages 26 may be adjacent to an upper surface of the base 21. The cable tie C passes through the passages 26 to strap the cables B to the saddle mount 20. The saddle mount 20 may have a single passage 26, for instance passing through the base 21.

Referring concurrently to FIGS. 2-4, a groove 27 is formed in the outer lateral surface 25 of each of the walls 23. As shown in FIG. 4, the groove 27 separates two portions of the lateral outer surface 25 against which the cable tie C lies, such that a space is defined between the surface of the groove 27 and the cable tie C. The space is used to accommodate the tip or nose of a cutter (e.g., a side cutter, a blade of a cutter or of a pair of scissors), to cut off the cable tie C.

The groove 27 is transversely positioned with respect to the cable tie C, to minimize the width of cable tie C to be sectioned to release the cables B from the saddle mount B. The groove 27 may have other orientations with respect to the cable tie C.

In FIGS. 2-3, the grooves 27 are each shown extending on the full width of their respective walls 23, to facilitate the manipulation of the cutting tool in the space. The groove 27 may be provided with an abutment wall at an end thereof to stop the movement of the cutting tool at the end of the groove 27. In FIGS. 2-4, both walls 23 have a groove 27. The saddle mount 20 may be provided with a single groove 27.

The saddle mount 20 is made of any suitable material, such as polymers, metals, alloys, composite materials or the like. In an embodiment, the saddle mount 20 is an integrally molded or cast into a single piece.

Now that the saddle mount 20 has been described, a method for strapping cables with and releasing cables from the saddle mount 20 is described.

The saddle mount 20 is firstly secured to a structure. Referring to FIG. 4, the saddle mount 20 is secured to a surface D. The base 21 lies on the surface D, and the fastener A is connected to the surface D with the head of the fastener A being accommodated in the counterbore 22. In the embodiment of FIG. 4, the fastener A is a bolt that is screwed into a tapped hole in the surface D.

An end of the cable tie C is then threaded through the passages 26. The cables B are then positioned within the saddle of the saddle mount 20. In an embodiment, the cables are already interconnected into a harness of cables, whereby the harness is positioned within the saddle of the saddle mount 20. As shown in FIGS. 3-4, the cables B may extend beyond the rounded edges of the walls 23. The ends of the cable tie C are subsequently tied to one another, and the cable tie C is tightened about the cables B in the manner shown in FIGS. 3 and 4, whereby the cables B are strapped to the saddle mount 20 by the cable tie C. As shown in FIGS. 3-5, the cable tie C interfaces with the outer lateral surfaces 25.

Referring to FIG. 5, in order to release the cables B from the saddle mount 20, a portion of a cutting tool E is inserted into the space defined by the surface of the groove 27 and by the cable tie C. The cutting tool therefore accesses the cable tie C, which may be sectioned while the wall 23 forms a shield between the cutting tool and the cables B. Therefore, the cables B are shielded from the cutting tool E when the cable tie C is being cut off to release the cables B. The saddle mount 20 may remain secured to the structure D for subsequent use.

The above description is meant to be exemplary only, and one skilled in the art will recognize that changes may be made without departing from the concepts described. For example, as shown in FIG. 6, the groove 27' may be provided between a pair of ridges 29' extending across the wall 23', rather than as a simple recess provided in the wall. As shown in FIG. 7, the groove 27" may be provided between the base 21" and a single protrusion 29" above outer surface 25". Other suitable configurations are also possible. Further, although groove is described, any suitable recess providing access for cutting the tying member may be used. Any suitable manner of providing access to an underside of the cable tie may be used, and groove and ridges are not required, per se. Any suitable shape and configuration of the saddle, and its base and walls, may be used. The particular nature of the tying member is not critical to the present concept. Although two walls providing a saddle are described, any suitable saddle/base shape and configuration may be used. For example, only one such wall may be provided. The "wall"(s) need not be a wall in a typical sense, but may be any suitable structure performing the function described herein. Still other modifications which fall within the scope of the present invention will be apparent to those skilled in the art, in light of a review of this disclosure, and the scope of the invention is therefore intended to be limited solely by the scope of the appended claims.

I claim:

1. A saddle mount for connecting elongated flexible items to a structure comprising:
    a base adapted to be secured to the structure;
    a pair of spaced-apart walls each projecting from the base to a wall free end, the walls thereby forming a saddle with the base, the walls each having an aperture between the base and the free end for receiving a tying member, the walls each having inner surface facing the other wall and an outer surface on an opposite side of the wall, at least one of the spaced-apart walls having in its outer surface at least one recess, the recess disposed between the aperture and the free end at a distance below a top rounded edge of the free end, the recess having an upper lip projecting laterally outwardly, the upper lip of the recess having a top surface curving downwardly in a laterally outward direction, the tying member bearing against the top surface of the upper lip, the upper lip and the tying member defining a cavity having a closed top end closed by a downwardly facing surface of said upper lip opposite said top surface thereof, the recess extending laterally across the outer surface a distance greater than a lateral width of the aperture, the recess thereby configured to permit a cutting surface to access an underside of the tying member extending through the apertures.

2. The saddle mount according to claim 1, wherein the at least one recess comprises a recess in the outer surface of each of the spaced-apart walls of the saddle mount.

3. The saddle mount according to claim 1, wherein the at least one recess is recessed relative to a remainder of the outer surface.

4. The saddle mount according to claim 1, wherein the at least one recess is a groove which extends across a full width of the saddle.

5. The saddle mount according to claim 4, wherein edges of the groove are normal to opposed ends of the base.

6. A cable mounting assembly comprising:
    a mount configured to be secured to a supporting structure, the mount having an interior area and at least one outer surface, the interior area configured to receive a cable-like item, the outer surface having an aperture for permitting insertion of an elongate cable tying member through the aperture for securing said item to the mount, the outer surface extending to a free end, the outer surface having a recess for providing access to an underside of the tying member to facilitate cutting the tying member, said recess disposed between the aperture and the free end at a distance from a top rounded edge of the free end, the recess having a laterally outwardly projecting upper lip for engagement with the tying member, the laterally outwardly projecting upper lip having a downwardly facing surface and an opposite top surface extending downwardly in a laterally outward direction for engagement with the tying member.

7. The cable mounting assembly according to claim 6, wherein said recess comprises a groove extending across the outer surface a distance greater than a lateral width of the aperture.

8. The cable mounting assembly according to claim 6, wherein the mount has at least a base and a wall extending upwardly from the base, the wall delimiting with the base said interior area and providing the outer surface.

9. The cable mounting assembly according to claim 8, wherein said wall comprises first and second walls extending from opposed sides of the base.

10. The cable mounting assembly according to claim 9, wherein the saddle mount has two recesses, with one of said recesses in each of the first and second walls.

11. The cable mounting assembly according to claim 8, wherein the aperture extends through the first and second walls adjacent to the base.

12. The cable mounting assembly according to claim 7, wherein the groove extends across a full width of the mount.

13. A method of providing a cable mounting apparatus, comprising:
   providing a mount having an open ended body having an interior area for receiving cables along a main axis, the body having an outer surface opposite to said interior area;
   defining a passage in said open ended body transversally to said main axis for receiving a cable tie;
   providing a groove on the outer surface of the body, the groove being spaced below a top edge of the open ended body and having a laterally outwardly projecting lip, the laterally outwardly projecting lip having a top surface curving downwardly in a laterally outward direction for providing a bearing surface for the cable tie; and
   sizing the groove to permit a cutting tool to access an underside of the cable tie.

\* \* \* \* \*